2 Sheets—Sheet 1.

J. STEPHENSON.

STREET-CAR DRAW-BAR.

No. 6,920. Reissued Feb. 8, 1876.

*Witnesses:*

D. G. Stuart

L. R. Bart.

*Inventor:*

John Stephenson by P. Hannay Atty.

N. PETERS, PHOTO-LITHOGRAPHER, WASHINGTON, D. C.

2 Sheets—Sheet 2.

J. STEPHENSON.

STREET-CAR DRAW-BAR.

No. 6,920. Reissued Feb. 8, 1876.

Witnesses:

D. G. Stuart

L. R. Bart

Inventor:

John Stephenson by S. Hannay atty.

N. PETERS, PHOTO-LITHOGRAPHER, WASHINGTON, D. C.

UNITED STATES PATENT OFFICE

JOHN STEPHENSON, OF NEW YORK, N. Y.

IMPROVEMENT IN STREET-CAR DRAW-BARS.

Specification forming part of Letters Patent No. 87,120, dated February 23, 1869; reissue No. 6,920, dated February 8, 1876; application filed August 20, 1875.

DIVISION H[4].

*To all whom it may concern:*

Be it known that I, JOHN STEPHENSON, of New York, in the county of New York and State of New York, have invented certain new and useful Improvements in Draw-Heads for Street-Cars; and I do hereby declare that the following is a full, clear, and exact description thereof, that will enable others skilled in the art to which it appertains to make and use the same, reference being had to the accompanying drawings, and to the letters of reference marked thereon, which form a part of this specification, in which—

Figure 1:
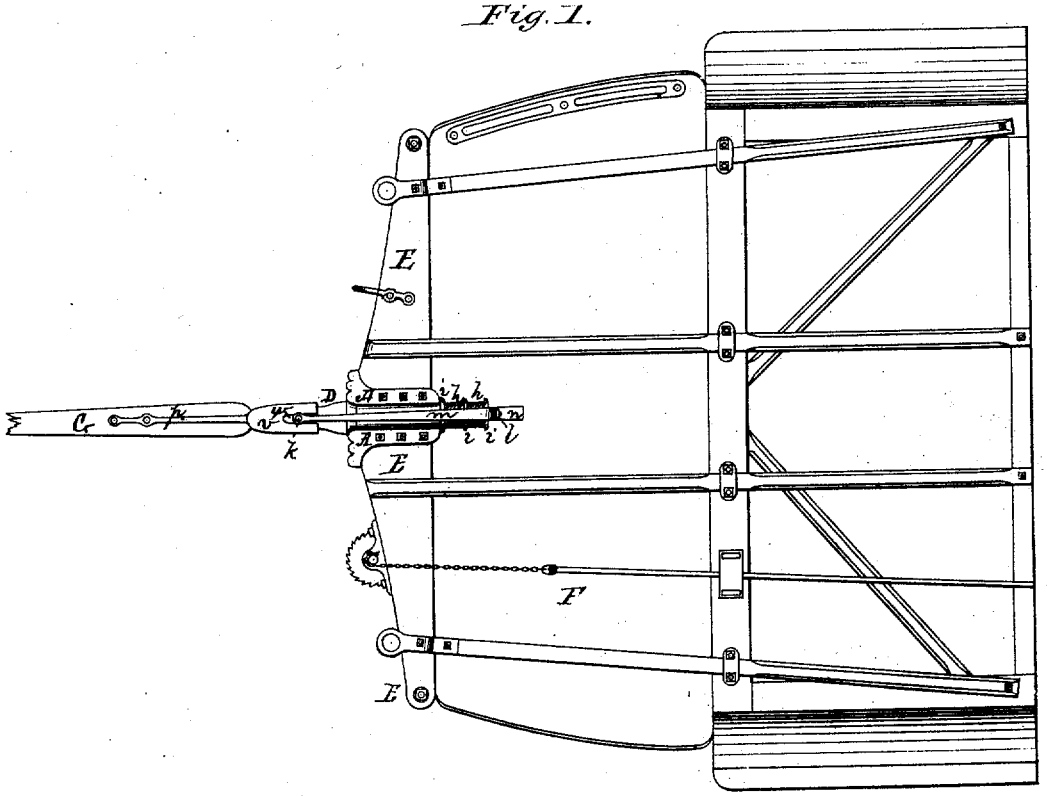
Figure 2:
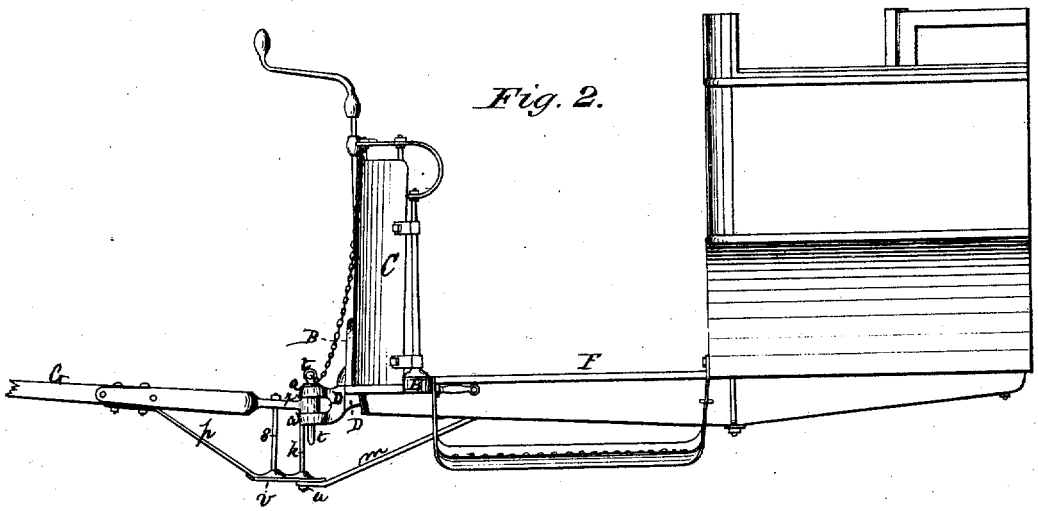
Figure 3:
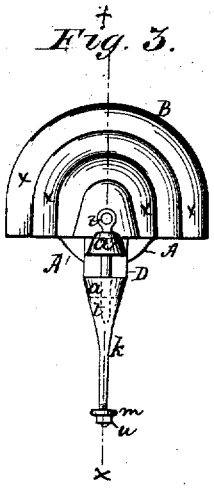
Figure 4:
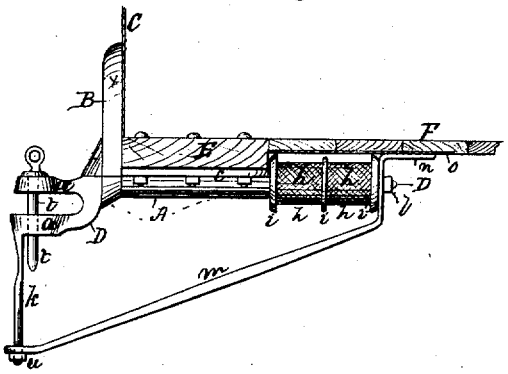
Figure 6:
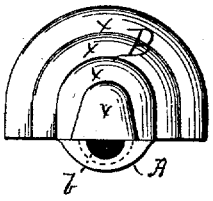
Figure 5:
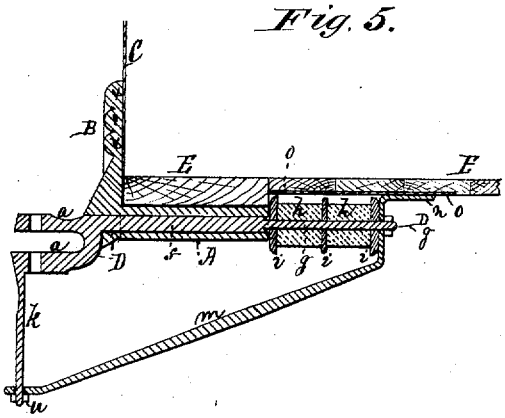
Figure 7:
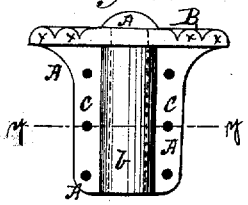
Figure 7A:
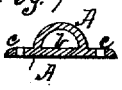
Figure 8:
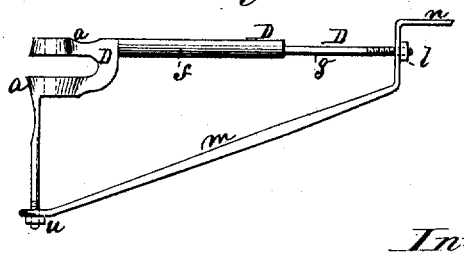

Figure 1 represents a plan of the under side of a portion of the forward end of a street-car to which my improvement has been applied, and Figure 2 a side elevation of the same. Fig. 3 represents a front view of the draw-head or buffer and sliding coupling-bar detached from the car; and Fig. 4, a side elevation of the same, showing the mode of securing it to the platform and nose-piece. Fig. 5 represents a vertical longitudinal section of the buffer and coupling-bar taken through the line *x x* of Fig. 3. Fig. 6 represents a front view of the buffer or socket-plate detached from the car, with the slide coupling-bar removed. Fig. 7 represents a plan of the under side of Fig. 6; and Fig. 7[a], a cross section of the same through the line *y y*, looking toward its rear end. Fig. 8 represents a side elevation of the slide coupling-bar and its brace or stay rod, both being detached or removed from the socket.

This division of my invention relates to the draw-heads of street-cars. To these, as heretofore constructed and applied to the platforms, there are several serious objections. In operating street-cars the most severe part of the service of a car-horse lies in the frequent starting of the car. The effort of the horse to put so much weight in motion, where there is no elastic or yielding device to relieve the strain, causes them to slip or fall on the pavement or rails. These slippages or falls frequently result in sprains or other severe injury or disablement; and, finally, end in causing spirited horses to balk. Again it frequently happens, in attaching the pole by horses to the car, that a rush or sudden backward movement plunges the back end of the pole through the sheet-iron which forms the dash-apron, there being no provision made for its protection.

Another serious objection to the use of draw-heads, as heretofore constructed, lies in the fact that the car-pole is a galling incumbrance to the horses, as the weight of the outer end of the pole and chains rest on their necks, producing sores and other discomforts, no means having heretofore been applied to relieve them from its strain and weight.

My invention is intended to remedy these evils; and consists, first, in combining a shield-plate or guard with the draw-head socket, whereby to protect the dash-apron from untoward thrusts of the pole in coupling the latter with the draw-bar; secondly, in constructing the draw-head socket and shield-plate in one piece, that the greatest strength and efficiency in the two may be attained at a low cost; thirdly, in combining, with a sliding draw-bar and its socket, a spring or springs, so arranged that the draw-bar will yield to the sudden strain of the horses in starting, thereby preventing them from slipping or falling; fourthly, in combining, with the draw-bar and its socket, a system of springs and stops or washers, so arranged that the recoil of the draw-bar is cushioned by the spring, whereby unpleasant jars and noises are avoided; fifthly, in constructing the sliding draw-bar with a pendent limb or stay-post, against which the pole-stay may abut and rest, to sustain the weight of the pole; sixthly, in providing the sliding draw-bar with a flexible or elastic limb or post, against which to brace and support the pole—this post is made elastic or flexible in order to render it capable of adjustment toward or from the pole, in order to raise or lower the end of the latter; seventhly, in combining, with the draw-head socket, a sliding draw-bar, provided with a pendent limb or other post, against which the pole stay or prop rests, abuts, or bears, for the purpose of sustaining the weight of the pole without the aid of the horse; eightly, in combining, with a sliding draw-bar, having a pendent limb or drop, a brace or stay, so arranged as to adjustably connect at one end with the lower end of the latter, and at its upper end with the farther or inner end of the sliding draw-bar, whereby the angle of the pole can be readily adjusted as required; ninthly, in constructing the upper end of the stay, which braces the foot of the pendent limb or post and connects it with the inner end of the sliding draw-bar, with a hand or arm of suitable form and size to bear against, and slide under, the floor of the car-platform, or such part thereof as may be adapted to the purpose. This stay, thus constructed and arranged to bear against the platform, gives great strength and rigidity to the pendent limb of the draw-head when properly adjusted and secured to it, and entirely relieves the limb from the strain of the weight of the pole. Moreover, when strongly constructed, the pendent limb may be dispensed with, and the pole, through its stay-bracket, entirely supported on its lower end, a simple stud-pin on the end of the stay being used in lieu of the pendent post. Tenthly, in combining, in a draw-head for a car, the following instrumentalities, to wit: a stationary shield-plate and draw-head socket, a sliding draw-bar, spring or springs, washers or collars, prop or support for pole, and prop-stay, whereby all the evils before referred to are remedied or counteracted.

To enable others skilled in the art to make, construct, and use my invention, I will now describe it in detail.

The draw-bar socket A has its fore part provided with a shield-plate, B, made in any desired form, and adapted to fit it against the dash-apron.

This plate I prefer to make of curvilinear form on its upper edge, and straight on its lower—as, for instance, semicircular or semi-elliptical—and with a corrugated surface, *x*, in order to afford strength and great capacity for resistance with lightness.

The object of applying shield-plate B to the draw-head socket is to protect the dash-apron from accidental blows from the pole when coupling it to the draw-bar with the horses attached. This object is best attained by forming or casting the shield and draw-head socket in one piece, as illustrated in Figs. 5, 6, and 7, and corrugating or roughening its surface.

The socket *b*, in socket-plate A, which receives the slide draw-bar D, passes entirely through the latter, as indicated in Figs. 5 and 7. Into this socket the draw-bar is free to move back and forth, as occasion serves. To prevent the draw-bar D from turning or twisting, I flatten one of its sides, preferably its upper side, and then correspondingly flatten the upper side of the socket *b*, as illustrated in Fig. 7[a], which is a cross-section through line *y y* of Fig. 7, looking toward the rear end of the socket-plate, the position of the upper and under sides being reversed—*i. e.*, turned up-side down. Socket-plate A is provided with with flanges *c*, by means of which it is firmly bolted to the nose-piece E of the platform, as shown in Fig. 4.

The draw-bar D consists of a coupling-piece, *a*, of any known suitable form, and the slide draw-bar *f* proper. The slide-bar *f* for a distance equal to, or thereabout, the length of the socket-hole *b* is made of such size and shape as to snugly fit the latter. Beyond that it is prolonged, and turned down so as to form a stem or rod, *g*, on which I arrange a rubber or other spring or springs, *h*, and collars *i*, as shown in Figs. 4, 5, and 8. On the outer end of rod *g* is cut a screw-thread, on which a screw-nut, *l*, fits. The parts are assembled by passing the bar D through opening *b* of the socket-plate A, then passing over it a large washer, *i*, and first spring *h*, then another washer, *i*, followed by the other spring *h*, and finally the third or outer washer *i*. This done, the nut *l* is then applied, and the whole screwed up to the tension required.

The inner washer *i* may simply bear against the inner end of socket-plate A; or it may form part of that end by being cast in one piece therewith; or it may be otherwise secured thereto. It is of such size as to form a suitable abutment for spring *h* to bear or press against. The outer washer *i* should be of same size, while the middle one need not be quite so large. But one spring, *h*, may be used, in which case the middle washer *i*, of course, would be dispensed with; but I prefer to use two.

Such is the form of the slide draw-bar where it is intended for use on a single-horse car, but where two horses and a pole are used, I provide the forward end of the draw-bar D with a pendent-arm or stay-post, *k*, at a point in front of the socket, on the end of which I mount the lower end of a brace-rod, *m*. The upper end of brace *m* is mounted on the rear end *g* of the draw-bar, it being held in place against the outer washer *i* by screw-nut *l*. To relieve the end *g* of the draw-bar from the strain of the brace *m*, the upper end of the latter is prolonged and bent back, so as to form a slide-arm, *n*, in such manner as to slide and bear against the under side of the platform F, or a metal plate, *o*, may be secured to the under side of the platform, against which the arm *n* may be made to bear and slide, as the draw-bar moves back and forth. Pendent post *k*, near its junction with the draw-head coupling *a*, I prefer to thin down or flatten out in the manner shown in Figs. 3 and 4—that is to say, in a line running crosswise of the car. This construction enables it to give or yield either forward or backward in the line of the length of the car. This flexibility of the post facilitates adjustment of its lower end, which at times may be required to advance or recede, in order to support the pole F at the desired level. In Fig. 2 is illustrated the method of supporting the pole by this plan. G indicates the pole, *r* its coupling-bar, passing in between the forks *a a* of the coupling of the draw-bar D, and to which it is secured by a pin or bolt, *t*, passing through corresponding and suitable eyes made in the ends of the couplings *r* and *a*. To the under side of the pole is secured one end of a brace or stay-prop, *p*, the rear end of which is made to embrace or abut against the lower or braced end of post *k*. To give strength and rigidity to prop *p*, its rear end is rigidly connected to the coupling-bar *r* of the pole by a standard or stay piece, *s*. The rear end of stay-piece *p*—and which is usually provided with a shoe, *u*, on which to drag the pole—is provided with an open slot, *w*, to engage with and embrace the lower end of stay-post *k*, so that the pole may be readily removed by simply withdrawing pin or bolt *t* from the eyes of the couplings *r* and *a*. Thus constructed and assembled, it will be apparent that by turning up the nut *u* on the lower end of post *k*, it will raise and support the outer end of the pole, and vice versa. In doing this, the strain or weight of the pole is, through stay *m* and its foot *n*, transferred to and borne by the platform, against the under side of which slide-arm *n* of brace *m* slides, rests, and bears, thereby entirely relieving the horses of its weight.

It will also be apparent that post *k* may be entirely removed and the same effect produced by simply strengthening stay *m* sufficiently, and providing its lower end with a stud-pin, against which the shoe *v* of the pole-stay *p* may abut and bear, precisely as it does against post *k*.

It is also to be observed that the precise means by which the couplings *a* and *r* of the draw-bar D and pole G are connected together do not form essential features of this improvement, as both of them may be constructed and connected in any known and suitable way without in any way effecting the nature of this division of my invention.

Having described my invention, what I claim as new, and desire to secure by Letters Patent, is—

1. The combination of a shield-plate, B, with the draw-head socket A and dash-apron C of a street car, substantially as and for the purpose set forth.

2. A draw-head socket, A, and shield-plate B, formed in one piece, substantially as set forth.

3. In a street-car, a sliding draw-bar, constructed at its forward end with a forked coupling-piece, *a*, in combination with a socket, A, and spring *h*, whereby the draw-bar is allowed to yield to the sudden strain of the horse on starting, substantially as and for the purpose set forth.

4. In a street-car, the combination of a sliding draw-bar, D, and its socket A, with a system of springs, *h h*, and washers or stops *i*, substantially as set forth.

5. A draw-bar, provided at its front end with a flexible pendent limb or post, *k*, for the purpose set forth.

6. The combination of a sliding draw-bar, provided at its front end with a pendent limb or post, with a draw-head socket, substantially as set forth.

7. The combination of a sliding draw-bar, provided at its front end with a pendent limb or post, with a brace, *m*, or stay, so arranged as to connect at one end with the lower end of the latter, and at the other with the inner end of the draw-bar, substantially as and for the purpose set forth.

8. The combination of a stay or brace, *m*, provided with a slide-arm, *n*, with a sliding draw-bar, in the manner and for the purposes substantially as set forth.

9. A draw-head for a street-car, composed of the following instrumentalities, to wit: a stationary socket, A, slide draw-bar D, spring *h*, washers *i i*, and brace *m*, substantially as and for the purpose set forth.

10. A draw-head for a street-car, composed of the following instrumentalities, to wit: a stationary socket, A, a slide draw-bar, D, provided with a pendent post, *k*, springs *h h*, and washers *i i i*, and brace-rod *m*, provided with a foot, *n*, the whole operating in the manner substantially as and for the purposes set forth.

11. The combination of a street-car pole, provided with a coupling, *r*, and supporting-bracket *p*, with a sliding draw-bar, and supporting-stay *m*, having a foot, *n*, substantially as set forth.

12. The combination of a street-car pole, provided with a coupling, *r*, and supporting-bracket *p*, with a sliding draw-bar, D, provided at its forward end with a pendent limb or post, *k*, and at its rear with a stay, *m*, substantially as set forth.

In testimony that I claim the foregoing I have hereunto set my hand this 21st day of July, 1875.

JOHN STEPHENSON.

Witnesses:

AUGUST RIPPERGER,
JOHN SMITH.